INVENTORS
WALTER ROCHUS
REINHOLD KICKUTH

ATTORNEY.

Feb. 27, 1962
W. ROCHUS ETAL
3,022,659
APPARATUS FOR THE FRACTIONAL SEPARATION OF
MATERIAL CONTAINED IN A
SOLUTION BY FREEZING
Filed Feb. 4, 1958
2 Sheets-Sheet 2
FIG. 2.
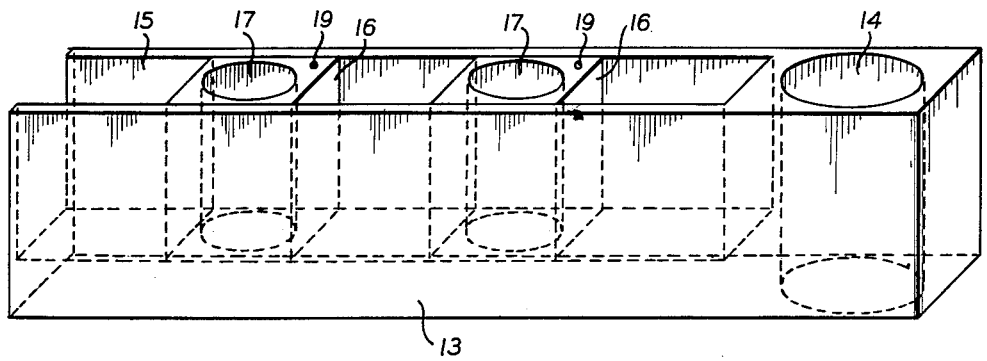
FIG. 5.
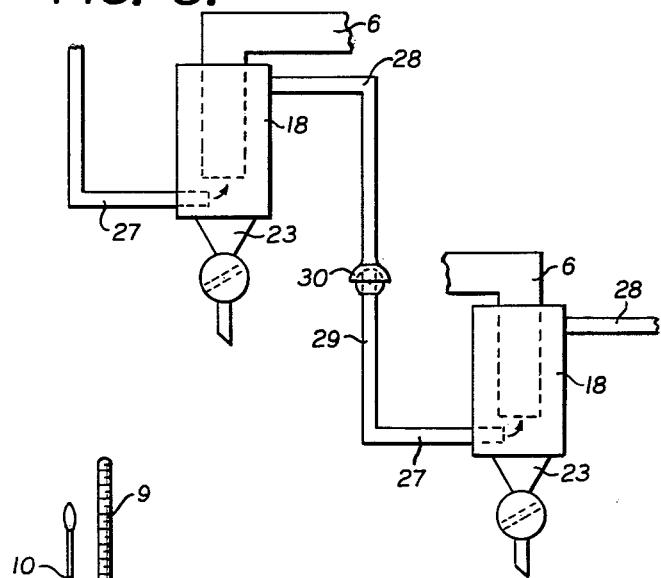
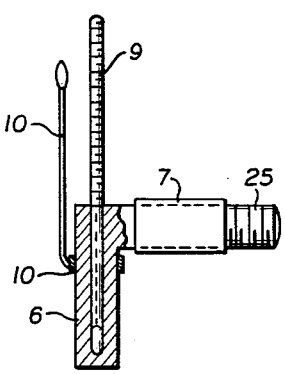
FIG. 4.
INVENTOR
WALTER ROCHUS
REINHOLD KICKUTH
BY
*Ernest Montague*
ATTORNEY.

3,022,659
Patented Feb. 27, 1962

3,022,659
APPARATUS FOR THE FRACTIONAL SEPARATION OF MATERIAL CONTAINED IN A SOLUTION BY FREEZING
Walter Rochus and Reinhold Kickuth, Gottingen, Germany, assignors to Chemieglas, Gebr. Schrickel oHG, Gottingen, Germany, a corporation of Germany
Filed Feb. 4, 1958, Ser. No. 713,129
Claims priority, application Germany Feb. 5, 1957
1 Claim. (Cl. 73—53)

The present invention relates to an apparatus for the fractional separation of material contained in a solution by freezing.

Freeze-out operations, frequently applied up to now for the isolation of natural substances, as ferments, proteins, sugar, hormones, antibiotica, etc. at exactly defined temperatures or at certain temperature intervals as well as for the separation of normally inseparable mixtures, as for instance m- and xylene, 2.6 and 2.7 dimethylnaphthalene, or of the isomers of methylchinolene, can only be carried out in accordance with the well-known stepwise freeze-out operations, by means of several freezing mixtures or in refrigerators having different temperatures.

It is, therefore, one object of the present invention to provide an apparatus for the fractional separation of material contained in a solution by freezing which uses a single source of cold continuous and fractional freeze-out and permits continuous and fractional operations in the range between the temperature of the source of cold and a second extensively variable temperature, in that the natural temperature gradient of a heat conductor is utilized.

Depending upon the purpose for which the apparatus is to be used, a reservoir is employed which contains either a freezing mixture or a heat source. A suitable heat conductor extends into this reservoir and is provided, at certain distances from the reservoir, with tapping projections shaped like pins, rods, or the like which are immersed in the containers for the substrate to be processed.

By immersing the tapping projections into the substrate, heat is transferred from the heat conductor to the substrate, the magnitude of the heat transfer being predetermined, i.e. heat is transferred at a temperature which corresponds to the distance from the reservoir and the coefficient of thermal conductivity of the heat conductor.

Preferably, the heat conductor is arranged vertically in the reservoir, or it is arranged horizontally, in which case the reservoir is conveniently accommodated at one end of the heat conductor. The tapping projections on the heat conductor are then formed of borings which receive the substrate containers.

The tapping projections and the substrate containers may be arranged in different ways. It is also possible to provide the substrate containers with an inlet and an outlet for the substrate and to connect the containers with each other so that the substrate can flow from one substrate container into the next one disposed below the former.

By utilizing the natural temperature gradient of the heat conductor, the heat at certain points is removed in a suitable manner, from the substrate to be evaporated or frozen-out at a temperature characteristic of the heat conductor. Within the temperature gradient of a given heat conductor any desired substrate temperature may be obtained by varying the arrangement of the tapping projections. By an empiric equation, temperature points can be located and marked on the heat conductor. The equation, of course, incorporates the material and the insulation of the heat conductor, the temperature at both of its ends and the thermal conductivity of the substrate to be frozen-out or evaporated. With the aid of the equation, the effective working length of the heat conductor, i.e. the length over which a practical temperature gradient is obtainable, as well as the tapping projection temperatures at different heights of the heat conductor can be determined.

In freeze-out operations, using an aluminum bar of 40 mm.$^2$ round section without insulation, an effective working length of approximately 600 mm. is possible between $t_1=-70°$ C. and $t_2=+20°$ C. at a depth of immersion of 100 mm. into the cold reservoir. The same rod, being insulated with cotton wool, ensures an effective working length of 1000 mm. under the same conditions. When considering a temperature gradient from $+10°$ C. to $-20°$ C. as being sufficient for many operations, the rod can be dimensioned accordingly with respect to its length and diameter.

It will be seen that by approaching an adiabatic heat transfer which can be achieved by good insulation, it is possible to operate over a long effective working length on the one hand, and on the other hand at temperatures which are more or less near the temperature of the reservoir. For example, on a non-insulated aluminum rod, the temperature rises to an extent so that 10 cm. above the reservoir only approximately $-15°$ C. are measured at a temperature of the reservoir of $-68°$ C. With the simplest form of insulation, by cotton wool, this value increases to $-23°$ C. For insulating the heat conductor foamy synthetic material has proved useful. An air insulation between the heat conductor and the glass jacket which may have reflecting inner walls, is also possible.

With these and other objects in view, which will become apparent in the following detailed description, the present invention will be clearly understood in connection with the accompanying drawings, in which:

FIG. 2 is a perspective view of another embodiment;

FIG. 4 is an embodiment of the tapping projections on the heat conductor;

FIG. 5 is a diagrammatic view of the connection of the various substrate containers.

Figure 1:
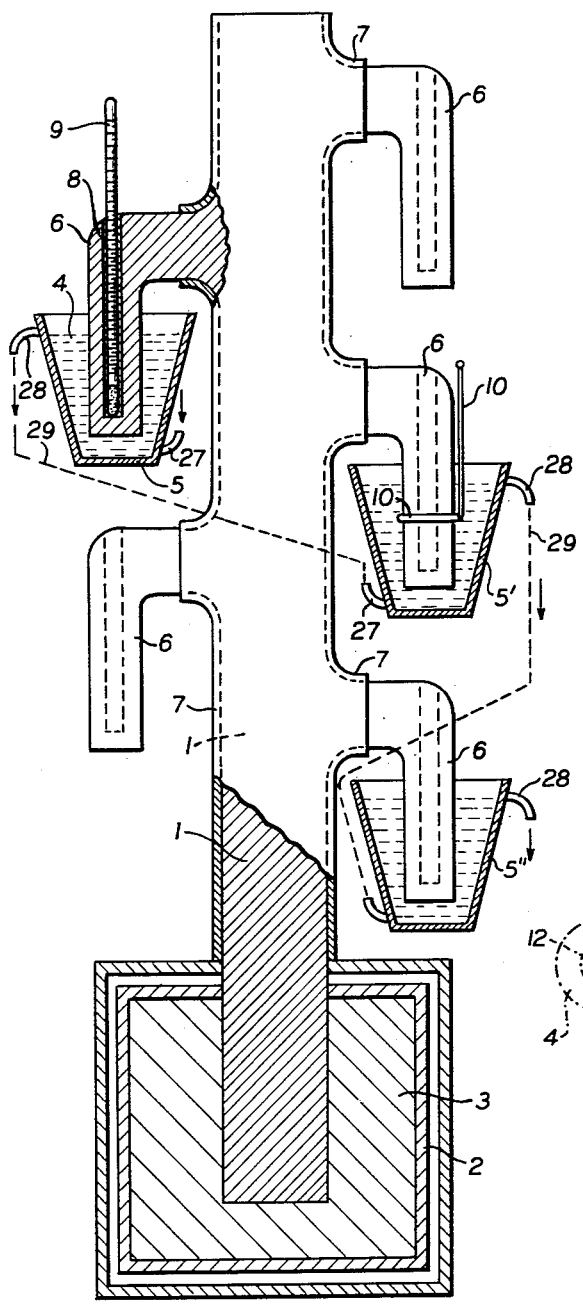
FIGURE 1 is an elevational view, partially in section, of the complete apparatus.

Referring now to the drawings, the different embodiments of the apparatus can be used for freeze-out operations. Substantially, the apparatus comprises a heat conductor 1 which, according to FIG. 1, is arranged vertically to be immersed into a reservoir 2 which serves as a cold room and which is insulated from all sides. For instance, the reservoir 2 may form a Dewar vessel and contain a mixture 3 of Dry Ice and methanol. The shape of the reservoir 2 is adaptable to the type of application of the apparatus. A round aluminum bar having a section of about 40 mm.$^2$ may be used as a heat conductor 1.

To effect a heat transfer from the heat conductor 1 to the substrate 4 contained in the substrate containers 5, 5', 5'', etc., rods or tapping projections 6 are used which conveniently are bent downwardly at right angles. Preferably, the rods 6 are connected with the heat conductor 1 and protected by an insulation 7 in the same manner as the heat conductor 1. An insulation made of cotton-wool or foamy synthetic material has proved satisfactory.

Each of the tapping projections 6 is provided with a boring 8 from above to receive a thermometer 9. For cleaning purposes each tapping projection 6 may have a scraper 10 which can be moved vertically along the tapping projections 6.

Figure 3:
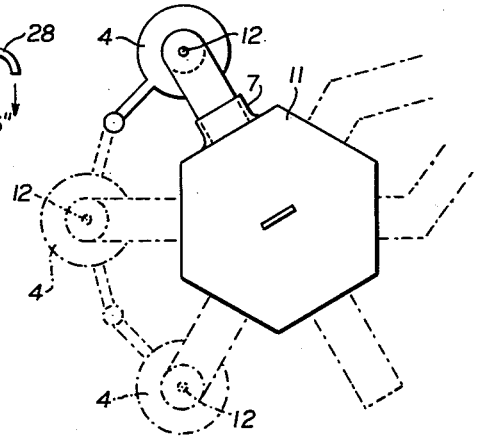
FIG. 3 is a diagrammatic view of the arrangement of the tapping projections and substrate containers.

Depending upon the embodiment of the heat conductor, a great number of tapping projections 6 may be arranged, one above the other, and vertically displaced relative to each other, or a hexagonal heat conductor 11, as shown in FIG. 3, may be employed, the tapping projections 12 of which are arranged at different heights and all over the circumference of the heat conductor 11.

The apparatus as described above, is an embodiment having fixed tapping projections 6, by which arrangement the temperature rise or decrease is predetermined. However, the tapping projections 6 may also be laterally movable. In this case, preferably the apparatus shown in FIG. 2 is used. Here, a heat conductor 13 is employed, which at its one end accommodates the heat or cold reservoir 14 and which is provided, over its total length, with a longitudinal guide slot 15. Sealing fitting members 16 can be moved in the guide slot 15 which members 16 are made of the same material as the heat conductor 13 and which have bores 17 to receive the substrate containers 18, as for instance beakers. Close to the bores 17 for the containers 18 another small bore 19 is provided to receive a thermometer (not shown). By displacing the tapping projections 6, the temperature intervals may be adjusted at will.

If the apparatus described is used for intermittent work, normal beakers may serve as substrate containers, the substrate being cooled by the tapping projection 6 extending into the container or by the fitting member 16 enclosing it.

Figure 6:
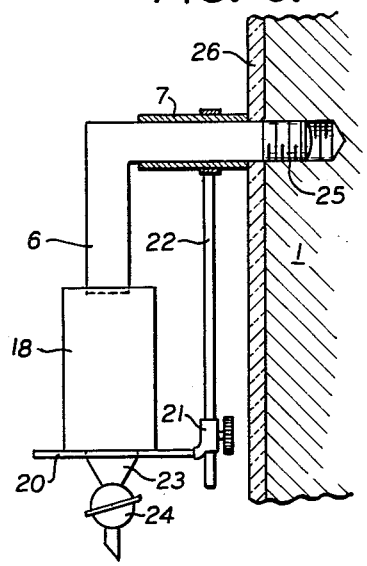
FIG. 6 is an elevation of the substrate container in connection with the tapping projections.

To mount the tapping projections 6 or the substrate containers 18, tables 20, as illustrated in FIG. 6, may be used which are adjustable as to their vertical position by adjusting means 21 slideable on a rod 22, which is fixed on the horizontal part of the tapping projection 6 and encloses the insulation 7.

In the arrangement shown in FIG. 6 the bottom of the substrate container 18 is provided with an outlet 23 which may be closed by a valve 24. To receive the outlet 23, the table 20 has a slot opening to the front side, so that the container 18 can be pushed on to the table 20 in the direction of the arrow, the outlet 23 extending downward through the slot.

FIGS. 4 to 6 disclose means for fixing the tapping projections 6 on the conductor 1. For this purpose, the horizontal part of the tapping projection 6 is threaded (as at 25) so that each tapping projection can be screwed into corresponding threaded bores in the heat conductor 1. In the arrangement shown in FIG. 6, a glass jacket 26 is provided for insulation.

It is to be understood that the embodiments of the apparatus illustrated can also operate continuously. For this purpose, the substrate containers 5 have an outlet 28 and an inlet 27 (FIG. 5) which may be connected with each other in a suitable manner by means of connecting pipes, hoses 29, or the like. Connection between the various substrate containers 5 is made in such a manner that the substrate which has been cooled in the uppermost container, is slowly and continuously passed, after sedimentation of the precipitate, from the outlet 28 at the top of the substrate container 5 through the inlet 27 of the next lower substrate container of greater cold which inlet 27 is disposed at the bottom of said container. This process is repeated in the same way when the substrate is transferred to the following containers of lower temperature, the substrate flowing from one container into the other being replenished.

FIG. 5 discloses the connection of the substrate containers 18 following each other, by means of pipes 29 which are fitted together by a ground-in ball and socket joint 30.

The containers receiving the substrate may be closed by a ground-in cover or the like and shaped as required depending upon the type of application. It is to be understood that the apparatus described is not only suited for work at low temperatures, but practically for all temperature ranges. Modifications, as for instance the exchange of a cold source against a heat source, is easily done. As a source of heat, for instance, an adjustable electric annular furnace may be used which per se is well-known and not described herein.

While we have disclosed several embodiments of the present invention, it is to be understood that these embodiments are given by example only and not in a limiting sense, the scope of the present invention being determined by the objects and the claim.

We claim:

An apparatus for fractional separation of material contained in a solution by freezing with lowering temperatures comprising a heat conductor, cooling means engaging one end of said heat conductor, a plurality of containers adapted to receive said solution and disposed in series along said heat conductor spaced apart from each other, tapping projections extending from said heat conductor into said containers and constituting heat transfer means from said heat conductor into said solution of said respective containers, each of said containers having an inlet conduit adjacent its bottom and an outlet conduit adjacent its top, and means connecting said outlet conduit of each of said containers with the inlet conduit of the next following of said containers in the series of said containers.

References Cited in the file of this patent
UNITED STATES PATENTS

| | | |
|---|---|---|
| 2,336,238 | Fordyce et al. | Dec. 7, 1943 |
| 2,464,546 | Albright | Mar. 15, 1944 |
| 2,730,892 | Bruce et al. | Jan. 17, 1956 |